J. VERDERBER.
UNIVERSAL JIG.
APPLICATION FILED APR. 5, 1919.
1,322,978.
Patented Nov. 25, 1919.
2 SHEETS—SHEET 2.
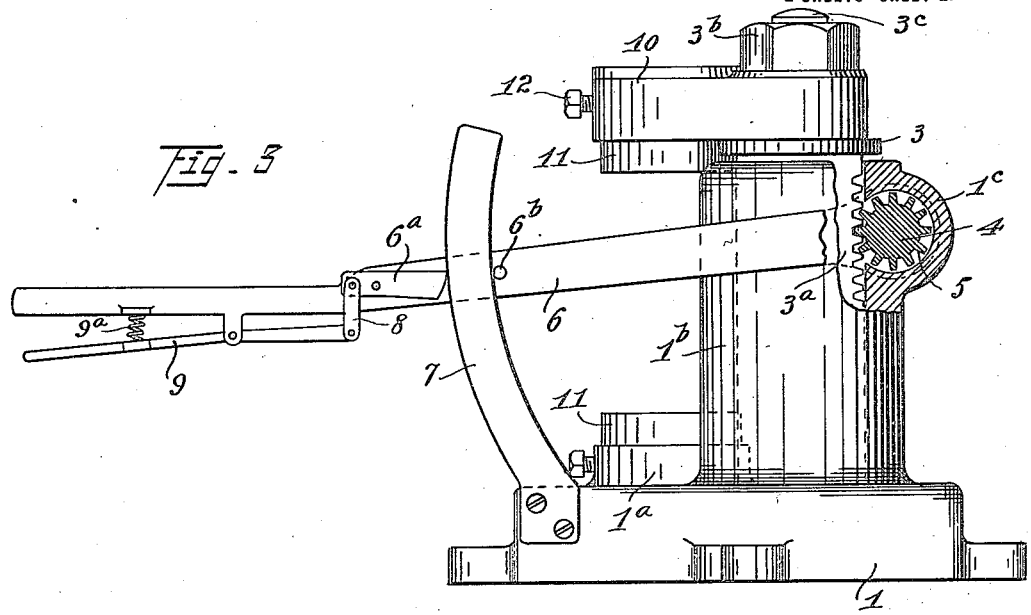
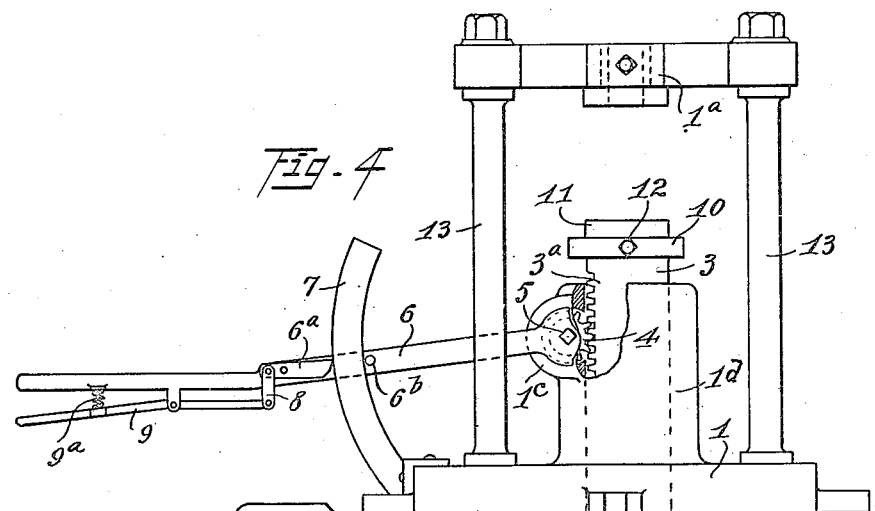
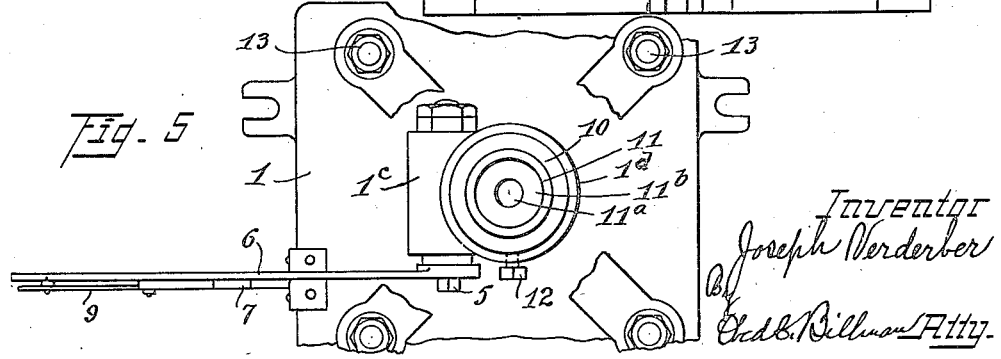
Inventor
Joseph Verderber

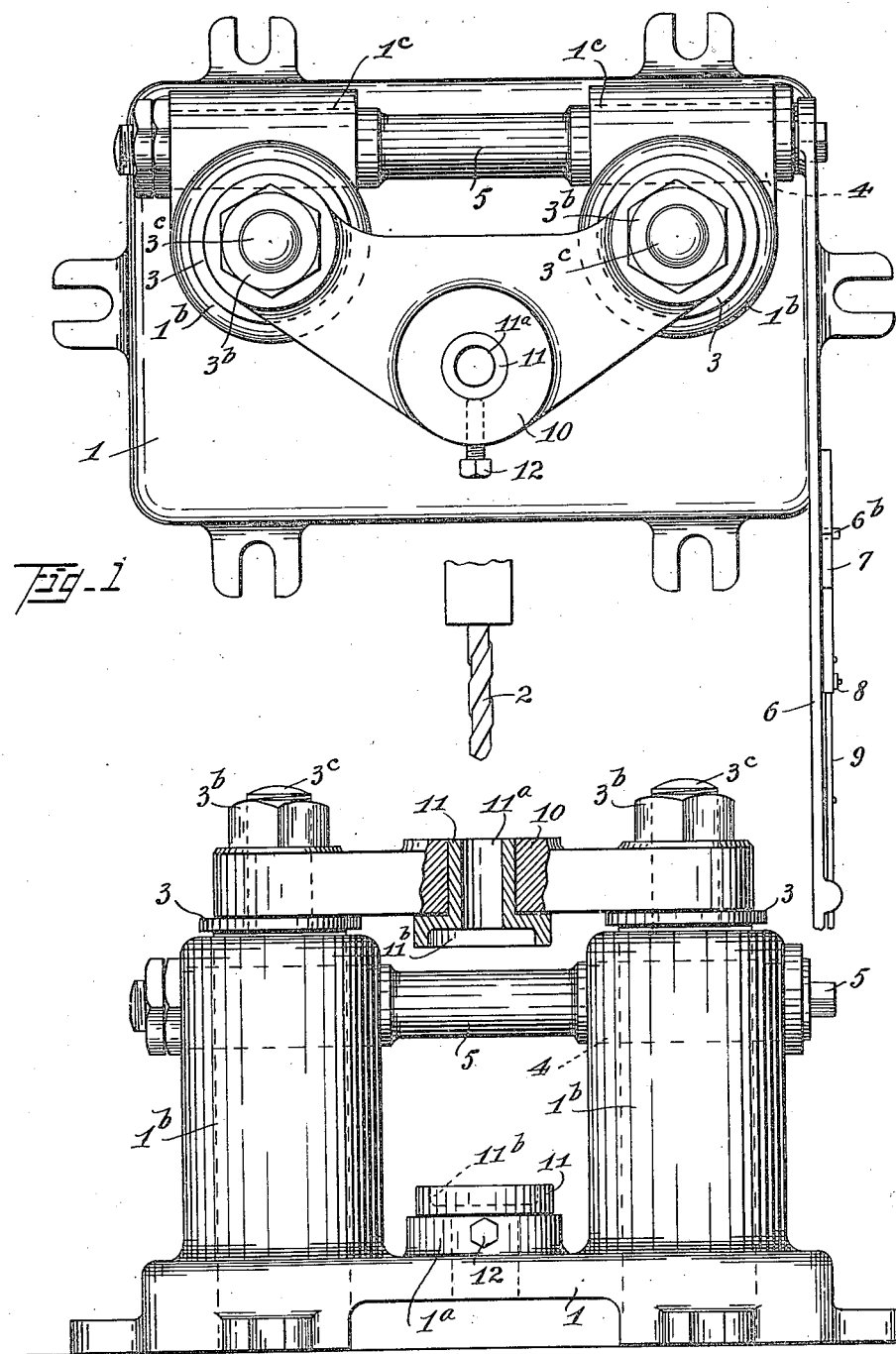

UNITED STATES PATENT OFFICE.

JOSEPH VERDERBER, OF CLEVELAND, OHIO, ASSIGNOR OF ONE-HALF TO HERMAN VERDERBER, OF CLEVELAND, OHIO.

UNIVERSAL JIG.

1,322,978.

Specification of Letters Patent.   Patented Nov. 25, 1919.

Application filed April 5, 1919.  Serial No. 287,677.

*To all whom it may concern:*

Be it known that I, JOSEPH VERDERBER, a citizen of the United States, residing at Cleveland, in the county of Cuyahoga and State of Ohio, have invented certain new and useful Improvements in Universal Jigs, of which the following is a specification.

My invention relates to improvements in universal jigs, the primary object of the invention being to provide a generally improved jig capable of a wide range of use and under varying working conditions in connection with boring and drilling machines and tools.

A further object is the provision of an improved jig of this class which will be exceedingly simple in construction, cheap of manufacture, and efficient in use.

A still further object is the provision of a jig of this class which will provide ready means for receiving and clamping the work and for readily inserting and removing the same in the work holding and drilling operation, as well as providing improved means for clamping the work and holding the same in any desired adjusted clamping position.

A still further object is the provision of improved carriage and carriage moving and adjusting means, together with improved coöperating anvil and drill guide heads adapted to readily receive article clamping drill bushings of suitable size and form to receive and clamp the particular work or article being operated upon.

With the above mentioned and other ends in view, the invention consists in the novel construction, arrangement, and combination of parts, hereinafter described, illustrated in some of its embodiments in the accompanying drawings, and particularly pointed out in the appended claims.

Referring to the drawings, forming a part of this specification, Figure 1, is a top plan view of a universal jig constructed in accordance with this invention.

Fig. 2, a front elevation of the same, a portion of the drill guide head being broken away and shown in section for the purpose of illustration.

Fig. 3, a side elevation of the same, a portion of the guide member or pedestal being broken away to show the carriage actuating and adjusting mechanism.

Fig. 4, a side elevation of a modified form of same.

Fig. 5, a top plan view of the modification shown in Fig. 4, a portion of the overhanging fixed guide or anvil portion being broken away for the purpose of clearer illustration of the parts.

Similar numerals of reference designate like parts throughout all the figures of the drawings.

The universal jig comprises a suitable attaching base or bed member 1, adapted to be attached to the machine or tool bed in any suitable and convenient manner. The base or bed 1, is provided with a suitable anvil or fixed member $1^a$, and a suitable guide portion, the latter preferably comprising vertical guide pedestals or columns $1^b$, as shown in Figs. 1 to 3, inclusive, of the drawings, or, if desired, a single guide member $1^d$, may be employed, as shown in Figs. 4 and 5, of the drawings. In the form shown in the latter instance it will be seen that the relatively fixed or anvil member $1^a$, is transposed in position so that the work to be operated upon will be moved upwardly by the movable head and carriage and into engagement with the anvil or fixed member $1^a$, for the purpose of holding and clamping the work and as hereinafter more fully described.

As a means of receiving and clamping the work or article being operated upon by the boring or drilling tool 2, (see top of Fig. 2, of the drawings) the vertical guides or pedestals $1^b$, are provided with a vertically movable carriage member 3, adapted to operate in suitable guide ways in the pedestal members $1^b$, said carriage member 3, being provided with a rack portion $3^a$, meshing with a pinion 4, mounted on a rock shaft 5. The rock shaft 5, may be mounted in suitable bearings $1^c$, on the guide pedestals $1^b$, in the form shown in Figs. 1 to 3, or in the form shown in Figs. 4 and 5, in a single bearing $1^c$, and a single guide $1^d$.

As a means of operating the rock shaft 5, together with the pinon 4, and carriage 3, whereby the latter is moved toward and from the fixed member or anvil $1^a$, said rock shaft 5, is provided with an operating lever 6, adapted to be operated from any suitable and convenient position and to be secured in any desired adjusted position by suitable locking and latching mechanism. In the present instance, such mechanism comprising a pivoted cam or toggle acting member $6^a$, pivotally connected to the operating handle 6, and adapted to coact with a segment bracket 7, extending from the base 1, and a guide pin 6$^b$, carried by the handle 6, in opposing relation thereto. The cam member 6$^a$, is connected to a link 8, the latter being connected to a second or auxiliary lever 9, pivoted beneath the main lever 6, and being adapted to be operated by the hand in an obvious manner against the resistance of a spring 9$^a$.

The vertically movable carriage 3, is provided with a guide head 10, which guide head, in the form shown in Figs. 1 to 3, inclusive of the drawings, is in the specific form of a cross head or forwardly projecting bracket and in the form shown in Figs. 1 to 3, inclusive of the drawings, is removably attached to the tops of the carriage members 3, by means of nuts 3$^b$, threaded upon threaded portions 3$^c$, of the carriage members.

As a means of adapting the movable carriage head and fixed or anvil member to drills or boring tools of varying sizes and also to work or articles of varying sizes and lengths, as well as of varying form, the guide heads 10 and the anvil or fixed members 1$^a$, are provided with article clamping drill bushings 11, removably secured by means of set screws 12. The article clamping bushings 11, are provided with drill receiving openings 11$^a$, and with article receiving pockets 11$^b$, it being obvious that by using bushings having drill openings adapted to the size of the particular drill, and having pocket openings adapted to conform to the ends of the article to be held and clamped, the improved jig may be readily adapted to drills and articles of work of varying form and size.

It will be also observed that by adjusting the guide head 10, on the threaded portions 3$^c$, through the adjusting nuts 3$^d$, the distance between the cross head 10 and the anvil 1$^a$, may be regulated somewhat to correspond with the length of the article or work being operated upon, and it will also be observed that the adjustment of the operating lever 6, on the segment bracket 7, will permit of an adjustment between the fixed and anvil head or member and the movable cross head on the carriage, and that this arrangement will permit the parts to readily conform to and adjust themselves to articles of work of some slight variation which frequently occurs.

Upon reference to the modification shown in Figs. 4 and 5 of the drawings, it will be observed that there has been a mere transposition of the fixed and movable cross heads or members and that in this instance the fixed or anvil member 1$^a$, is supported above the carriage and the guide head carried thereby, by means of pedestals or columns 13, and it will also be observed that in this instance a single guide column or pedestal 1$^d$, is employed and consequently only one rack 3$^a$, and only one pinion 4, is employed instead of two racks and pinions on the rock shaft 5, as shown in Figs. 1 to 3, of the drawings.

From the foregoing description, taken in connection with the accompanying drawings, the operation and advantages of my invention will be readily understood.

Having thus described some of the embodiments of my invention, what I claim and desire to secure by Letters Patent, is,—

1. In a universal jig, a base member provided with a vertically extending guide member, a carriage member provided with a rack movable within said guide member, a rock shaft provided with a pinion within said guide member and meshing with said rack, a lever on said rock shaft, a segment bracket on said base member, and means on and movable with said lever for automatically connecting said lever in various positions on said segment bracket, as moved forwardly and as against retrograde movement when so moved and for manually releasing the same for a return movement of such lever and carriage member.

2. A universal jig, comprising an attaching base provided with an anvil and a vertically extending guide pedestal, a carriage provided with a guide vertically movable in said guide pedestal, a guide head on said carriage in coöperative relation to said anvil, article engaging and drill guide members removably mounted in said anvil and said guide head, respectively, means for moving said carriage and guide head toward and from said anvil for clamping and engaging the article operated upon between said article engaging and drill guide members, and means on the carriage moving means for automatically securing said carriage moving means in adjusted position.

In testimony whereof I have affixed my signature.

JOSEPH VERDERBER.